Nov. 17, 1953    A. H. VEITCH    2,659,874
COLLECTOR PLUG FOR BUS BAR DUCT SYSTEMS
Filed April 1, 1949    2 Sheets-Sheet 1
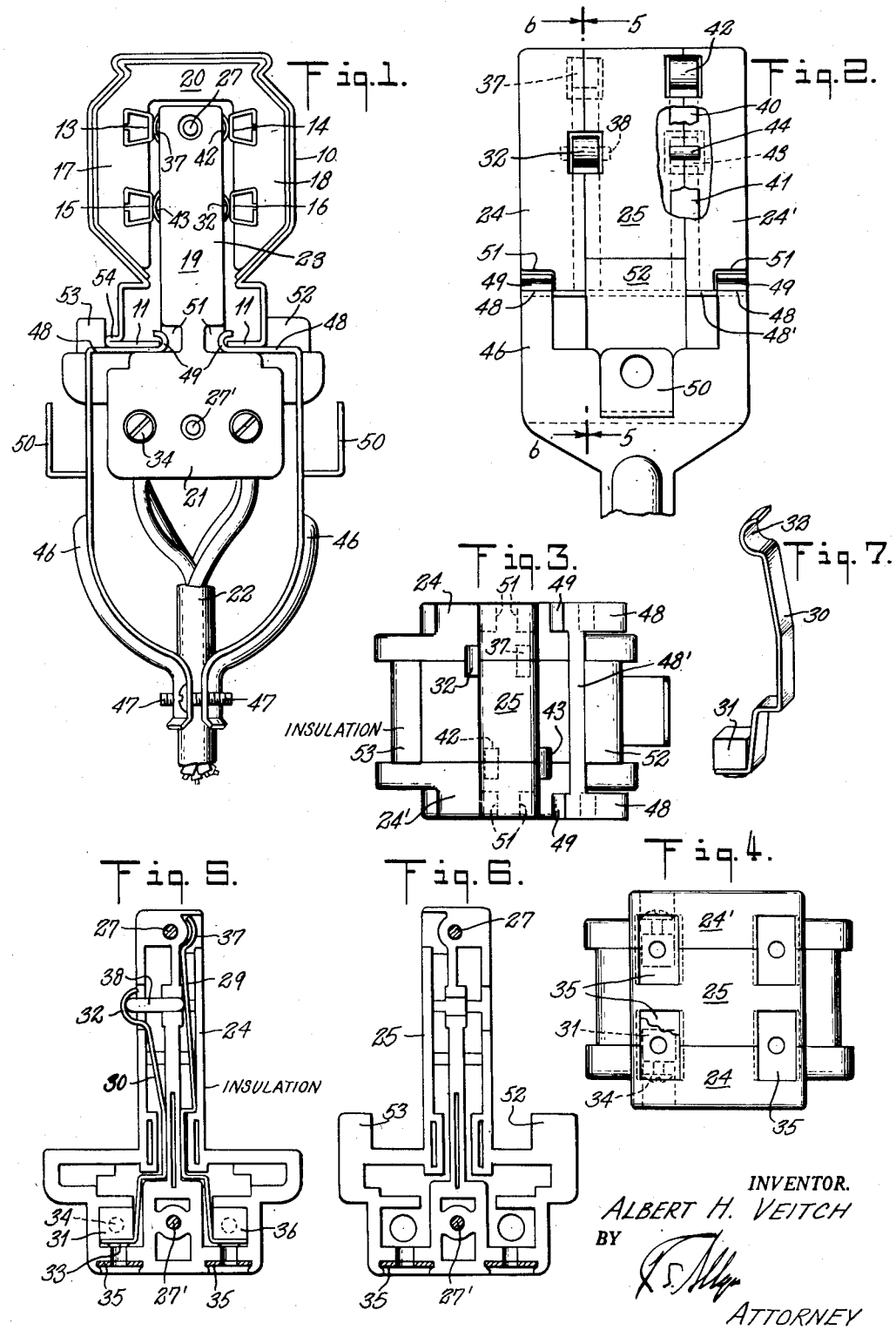
INVENTOR.
ALBERT H. VEITCH
BY
ATTORNEY Nov. 17, 1953  A. H. VEITCH  2,659,874
COLLECTOR PLUG FOR BUS BAR DUCT SYSTEMS
Filed April 1, 1949  2 Sheets-Sheet 2
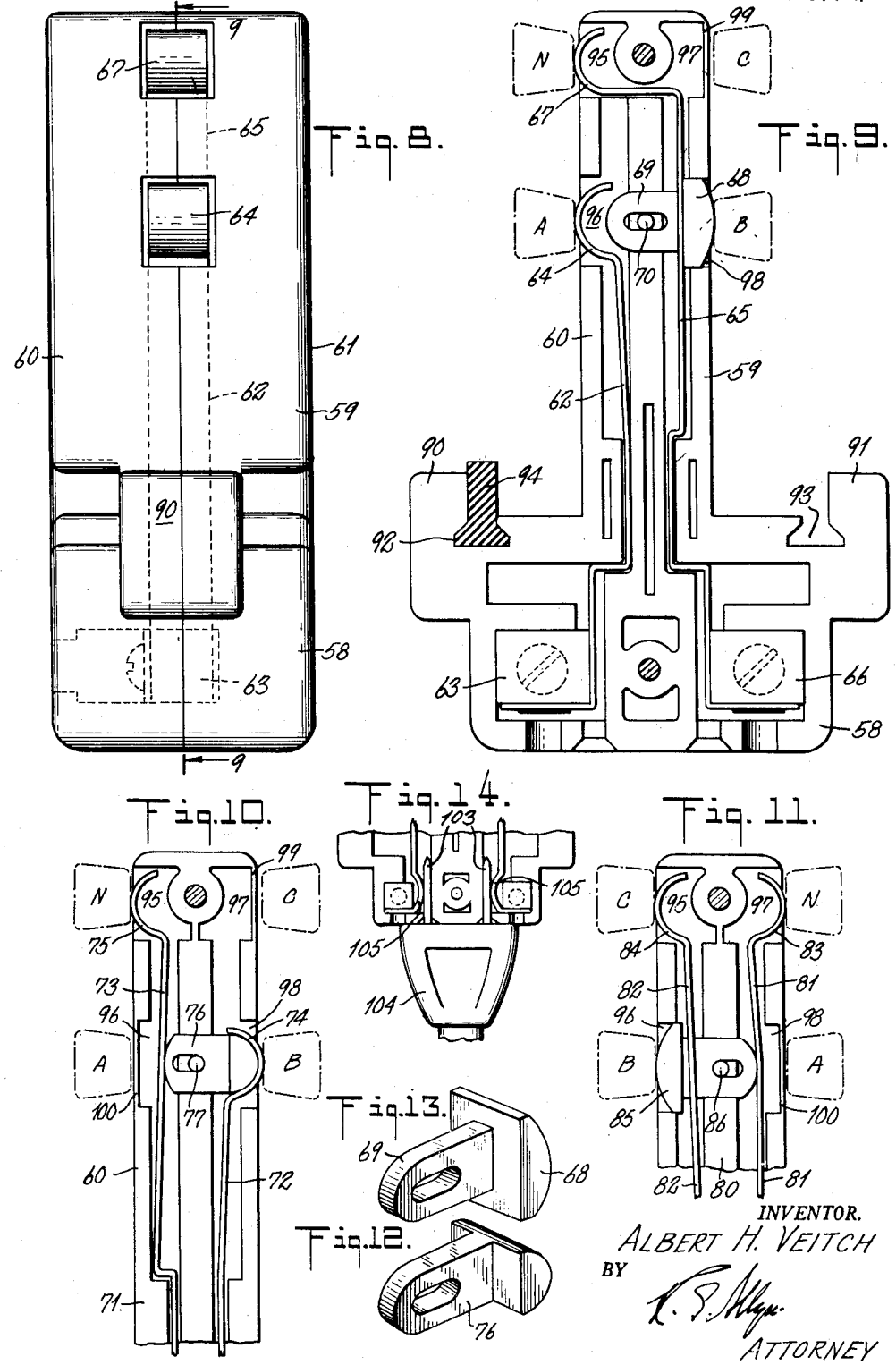
INVENTOR.
ALBERT H. VEITCH
BY
ATTORNEY Patented Nov. 17, 1953

2,659,874

UNITED STATES PATENT OFFICE 2,659,874

COLLECTOR PLUG FOR BUS BAR DUCT SYSTEMS

Albert H. Veitch, Plainville, Conn., assignor, by mesne assignments, to General Electric Company, a corporation of New York Application April 1, 1949, Serial No. 84,922

7 Claims. (Cl. 339—176)

1

My invention relates to bus bar duct power distribution systems of the type described and claimed in Patent 2,626,301, Hammerly, and particularly to a system having four bus bars.

The main object of the invention is to provide a collector plug which is simple and efficient and can be readily inserted and held in a duct having oppositely arranged bus bars.

A special object is to avoid accidental misconnection.

Another object is to cause the contacts to automatically engage the respective bus bars when the plug is mounted in the duct.

Another object is to provide special plugs for taking current from each of the phases of a three-phase system.

Fig. 1 shows a cross section of a duct with four bus bars with one form of collector plug and yoke in place.

Fig. 2 is a face view of the plug of Fig. 1, with a part of the holding yoke in place.

Fig. 3 is a plan view of the plug of Figs. 1 and 2.

Fig. 4 is a bottom plan view of the plug.

Fig. 5 is an inside view of a section of the plug looking in the direction of the arrows 5—5 of Fig. 2.

Fig. 6 is an inside view of a section of the plug looking in the direction of the arrows 6—6 of Fig. 2.

Fig. 7 is a perspective view of one of the conductor members of the plug of Figs. 1-5.

Fig. 8 is a face view of another form of plug for drawing current from the A-phase of the circuit.

Fig. 9 is an inside view of a section of the plug of Fig. 8 looking in the direction of the arrows 9—9.

Fig. 10 is a similar view showing the contact conductors arranged for drawing current from the B-phase.

Fig. 11 is a similar view showing the contact conductors arranged for drawing current from the C-phase.

Figs. 12 and 13 are perspective views of transfer members of Figs. 10 and 11, respectively.

Fig. 14 is a sectional view of a fragment of the base of a plug modified to receive the blades of an attachment plug for a branch circuit.

The tubular duct 10 is formed of sheet metal and has inturned flanges 11, 11 spaced from each other to form an entrance or passage leading to bus bars 13, 14, 15 and 16. These bus bars are supported by insulating means including parts 17 and 18 at intervals along the sides of the duct so as to leave room between bars 13 and 15 at one

2 side and bars 14 and 16 on the opposite side for the insertion of the collector plug 19. The insulating means may be in the form of U-shaped plates having parts 17 and 18 connected at 20 and suitably secured in the duct.

When a trolley is not intended for use in the duct, the bus bars may be inserted in perforated insulating plates arranged at intervals along the duct.

Each plug is formed of molded insulating material having a base 21 to which the branch cord or cable 22 is attached and an extension 23 which has the contacts for insertion into the slot in the duct between the bus bars 13 and 15 at one side and bus bars 14 and 16 on the other side. The plug is formed of three sections 24, 24′ and 25 held together by screws or rivets 27, 27′. The conductors 29 and 30 are mounted in recesses and grooves in the adjacent faces of the sections 24 and 25. Conductor 30 has a terminal block 31 at one end and a contact 32 at the other. An eyelet 33 provides a socket for a take-off wire tip leading to the block 31 where the wire is secured by a set screw 34. Each wire socket is marked with an identifying colored tab 35 inserted between the sections.

Conductor 29 similarly has a terminal block 36 at one end and a contact 37 at the outer end. Conductor 29 is resilient and biased inwardly so that contact 37 does not normally protrude from the side of the plug. Conductor 30 is also resilient and is biased outwardly so that the contact 32 normally protrudes from the plug. An insulating slide 38 is interposed between the outer end of conductor arm 30 and conductor arm 29 so that when plug 19 is inserted into the duct and contact 32 engages bus bar 15, the contact 32 is pushed inwardly and forces slide 38 across the plug and pushes conductor 29 which moves its contact 37 out against bus bar 14.

Conductors 40 and 41, exactly like 29 and 30 are mounted between sections 24′ and 25 and have contacts 42 and 43 like contacts 37 and 32, respectively. Slide 44 is pushed inwardly by conductor 41 when contact 43 engages bus bar 16 and thus contact 42 is protruded from the plug. Thus when the plug is pushed into the duct the outer contacts 37 and 42 pass by the bus bars 15 and 16 without touching them until the contacts 32 and 43 engage bus bars 15 and 16 whereupon contacts 37 and 42 are forced out into engagement with bus bars 13 and 14.

For handling the plug and relieving the strain from the terminal set screws I provide a yoke having two arms 46, 46 which are clamped to the cable 22 by screws 47, 47 and has flanges 48, 48 which terminate in hooks 49, 49, as described and claimed in Patent Number 2,611,801 to Hammerly et al., dated September 23, 1952. These arms are biased so as to press the hooks outwardly into engagement with the flanges 11, 11 of the duct. Each pair of hooks is connected by a cross bar 48' which limits the outward spreading of the arms of the yoke. To disengage the hooks from the flanges and remove the plug, the projections 50, 50 on the arms 46, 46 are pressed inwardly. The plug has recesses 51, 51 to allow for the hooks.

The plug extension is symmetrical with respect to the main part of the duct including its inner flanges 11, 11 but I have provided shoulders 52 and 53 at unequal distances from the central plane of the plug so as to allow for an outwardly projecting flange 54 which is provided on the duct for ensuring the insertion of the plug in a predetermined manner and thus doing away with the necessity of sectionalizing the duct.

On sheet two, in Figs. 8-11, I have shown a modified type of plug, capable of providing connection to only two of four bus bars at one time. For understanding the construction and operation, we will assume that bus bar N is neutral and the other bus bars A, B and C represent the conductors of a three-phase system in which the bus bars are mounted as in Fig. 1.

In this case, the plug has a base 58 and an extension 59 and is formed of two sections 60 and 61 and the conductors with their contacts are constructed and supported in a manner similar to those shown on sheet one of the drawings.

Conductor 62 has a terminal block 63 and a spring arm terminating in a contact 64 normally biased outwardly to engage bus bar A when the plug is inserted into the duct (not shown). Conductor 65 is anchored to the terminal 66 and biased to normally retract the contact 67. Slide 68 is normally protruded by spring member 65 from the plug and has a shank 69 which passes freely through conductor 65 and is guided to slide on projection 70. When the plug is inserted into the duct, contact 67 passes bus bar A without contact but is forced into contact with bar N when the slide 68 engages bus bar B and is pushed inwardly.

The plug 71 of Fig. 10 has two conductors 72 and 73 with contacts 74 and 75. Contact 74 is biased outwardly and contact 75 is biased inwardly. A slide 76 guided by pin 77 is interposed between the conductors and is biased by conductor 73 so that when a plug is inserted into a duct between the bus bars as shown, bus bar B will force contact 74 and slide 76 inwardly and thus press conductor arm 73 and its contact 75 outwardly to engage bus bar N.

In a similar manner plug 80 Fig. 11 encloses the conductors 81 and 82 with their contacts 83 and 84. The latter is biased outwardly to engage bus bar C and contact 83 is biased inwardly. A slide 85 (like 68) is guided by projection 86 and pressed outwardly by conductor 81 to engage bus bar B. When the plug is inserted into the duct between the bus bars, slide 85 is pushed in by its engagement with bus bar B and the conductor is thus pressed in so as to cause contact 83 to protrude and engage bus bar N, thus providing for a take-off from bus bars N and C.

The base of the plug in Fig. 9 is shown with shoulders 90 and 91 and undercut grooves 92 and 93 for stops such as 94 by which to ensure application of a predetermined plug to a duct having an outside flange 54 as in Fig. 1.

It will be understood that plugs such as shown on sheet two may have a yoke for handling the plug as previously shown and described.

From the foregoing it will be seen that the plug of Figs. 8-11 is formed of two symmetrical parts with two recesses 95, 96, 97, 98 at each side of the extension capable of receiving the contact and of a resilient conductor strip. Each recess which is to receive a contact as at 95 and 96 for bus bars N and A in Fig. 9, or as at 95 and 98 for bus bars N and B in Fig. 10, or as at 95 and 97 for bus bars C and N in Fig. 11, or to receive a slide 68 for bus bar B in Fig. 9 or for slide 85 for bus bar B in Fig. 10 is open to permit the contact or slide to protrude in order to engage the proper bus bar when the plug is inserted into a duct. The other recesses are closed by a thin wall such as 99 in Fig. 9, or 99 and 100 in Figs. 10 and 11.

With the forms of plugs shown in Figs. 8 to 11 connections can be made to only two bus bars. The forms of collector plug shown in Figs. 8 to 11 which have only two conductors may be modified to receive the blades 103 of an ordinary attachment plug 104 as shown in Fig. 14. Here the conductors have resilient contacts 105 adjacent the terminal blocks and the base of the plug has passages for the blades thus simplifying the connection of the plug to the branch conductor.

With the first form of plug shown in Figs. 1 to 6, it will be understood that connections can be made with any or all of the four bus bars depending upon which circuit terminals 31, 36 etc. are used.

I claim:

1. A collector plug for a bus bar system comprising an insulating body having a base and an extension formed of a number of parts, spring members mounted between said parts and arranged in pairs, one member in each pair being shorter than the other member of the same pair and having a contact normally protruding from the extension and the other member of said pair having a contact normally retracted and means coacting between said respective shorter and longer spring members whereby pressure on the shorter member contact causes the longer member contact to protrude from said extension.

2. A collector plug for a bus bar system comprising an insulating body having a base and an extension, spring conductor members mounted in the base, one member being shorter than another member and having a contact normally protruding from one side of the extension and another member having a contact normally retracted and means coacting between said members whereby pressure on the shorter member contact causes the longer member contact to protrude.

3. A branch circuit collector plug having an extension and a base formed of a number of sections of insulation, two conductors mounted between adjacent sections, each having a circuit terminal in the base and a contact at one side of the extension, one contact normally projecting from the surface of the extension and the other contact being normally retracted and a member movable between said conductors by which one conductor moves the other conductor when the plug is inserted into a duct.

4. A branch circuit collector plug having an insulating base and an extension shaped for insertion into a bus duct, a spring-biased contact mounted near the outer end of said extension and normally biased inwardly of one side surface of said extension and a second contact mounted nearer the base than the first-mentioned contact and normally biased to project outwardly from the said side surface of the extension for engaging a bus bar, and an actuating member mounted in said extension and normally spring-biased to project outwardly from the opposite side surface of the extension, and means of connection between said actuating member and said first-mentioned contact so that upon retraction of said actuating member said first-mentioned contact is projected outwardly of said extension for engaging a bus bar.

5. A branch circuit collector plug having an insulating body with a base and an extension shaped for insertion into a bus duct, spring-biased contact members mounted in said extension, one of said contact members being biased inwardly of one side surface near the outer end of said extension and another contact member being biased outwardly from the opposite side surface of said extension, and a transversely movable actuating member coacting between said contact members for projecting said first-mentioned contact member outwardly of said extension upon insertion of the plug.

6. In a branch circuit collector plug, a body of insulating material having a base and an extension shaped for insertion into a bus duct, spring-biased contacts mounted in said extension near the outer end thereof and adapted to project through the opposite sides thereof, one of said contacts being spring-biased outwardly of one side and the other contact being spring-biased inwardly and a slide member coacting with said contacts and spring-biased outwardly of said extension for projecting outwardly the inwardly biased contact.

7. A collector plug for insertion into a slotted bus bar duct having an inner and an outer pair of spaced bus bars therein, comprising a body portion shaped for insertion into the duct, two pairs of operatively connected contacts supported in said body portion, one contact of each pair being positioned adjacent the leading end of the body portion upon insertion into the duct and being spring-biased inwardly of the surface of the body portion out of contact with the bus bars, the other contact of each pair being positioned intermediate the ends of the body portion and being spring-biased outwardly of the surface of the body portion into position for contact with a bus bar upon insertion into the duct, and an insulating actuating member interposed between the intermediate contact and the end contact of each pair and adapted to be moved by the intermediate contact upon insertion of the plug for moving the paired end contact into position for contacting a bus bar.

ALBERT H. VEITCH.

References Cited in the file of this patent

UNITED STATES PATENTS

| Number | Name | Date |
| --- | --- | --- |
| 951,505 | Mather | Mar. 8, 1910 |
| 1,159,567 | Burton | Nov. 9, 1915 |
| 1,812,956 | Howk | July 7, 1931 |
| 1,909,140 | Wermine | May 16, 1933 |
| 2,018,016 | Frank et al. | Oct. 22, 1935 |
| 2,093,677 | Hickman et al. | Sept. 21, 1937 |
| 2,310,024 | Frank et al. | Feb. 2, 1943 |
| 2,443,371 | Barner | June 15, 1948 |
| 2,536,282 | Hammerly et al. | Jan. 2, 1951 |